(No Model.) 3 Sheets—Sheet 3.
D. HOUSER.
HARVESTER.
No. 354,421. Patented Dec. 14, 1886.
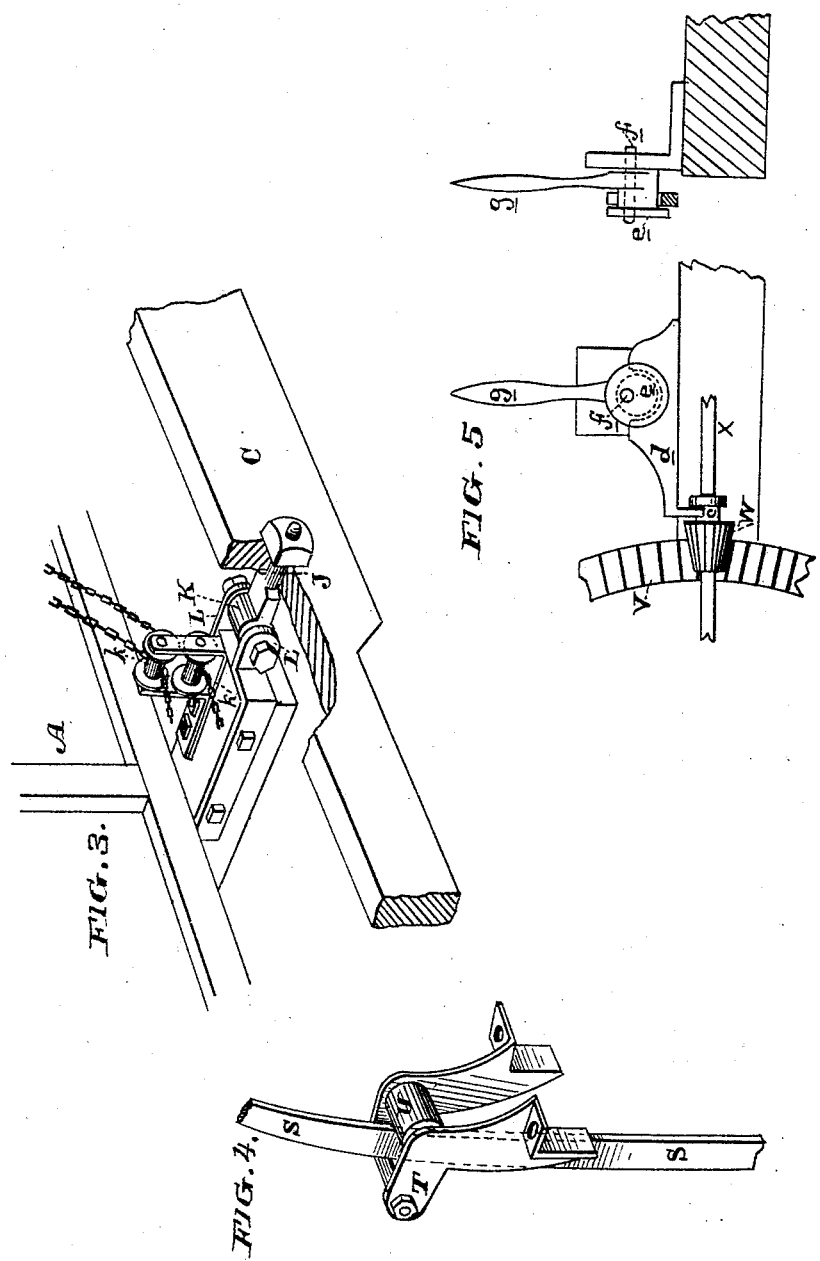
Witnesses,
Geo. H. Strong.
J. H. Howse.
Inventor,
Daniel Houser.
By Dewey & Co.
Attorneys

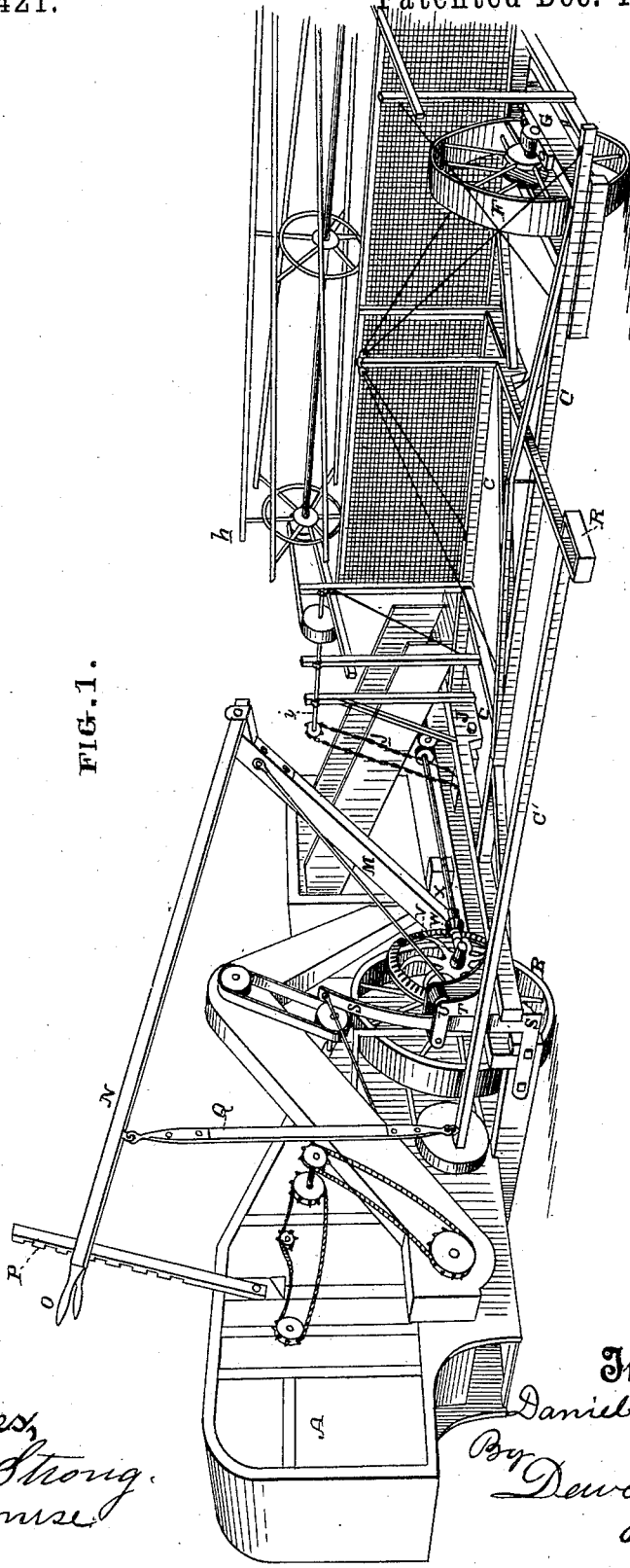

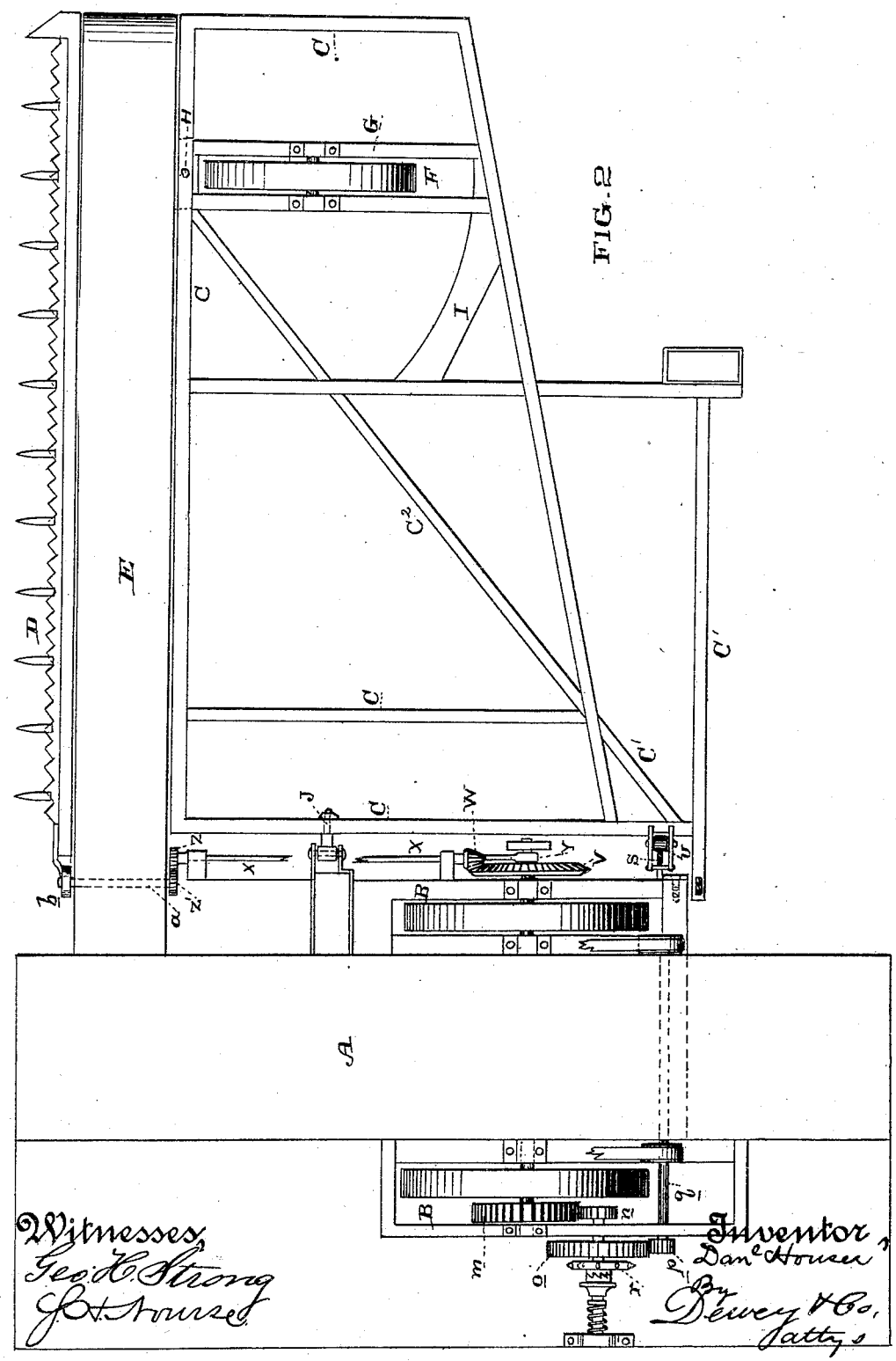

UNITED STATES PATENT OFFICE.

DANIEL HOUSER, OF STOCKTON, CALIFORNIA.

HARVESTER.

SPECIFICATION forming part of Letters Patent No. 354,421, dated December 14, 1886.

Application filed January 15, 1885. Serial No. 153,031. (No model.)

*To all whom it may concern:*

Be it known that I, DANIEL HOUSER, of Stockton, San Joaquin county, State of California, have invented an Improvement in Harvesters; and I hereby declare the following to be a full, clear, and exact description of the same.

My invention relates to certain improvements in harvesting machinery of that class in which the header or mechanism for cutting the grain is connected with a thrashing, separating, and cleaning mechanism, so that it may be cut, transferred from the header to the thrasher and thrashed, separated, and cleaned in one operation, and while the machine is hauled about the field.

Figure 1 is a perspective view of the apparatus, taken from the rear of the header. Fig. 2 is a plan view. Fig. 3 is an enlarged perspective in detail showing the universal joint and pivot about which the header-frame moves. Fig. 4 is an enlarged view of the guide for the rear of the header-frame. Figs. 5 are enlarged side and edge views of the mechanism for throwing the pinion in and out of gear.

In my former application for Letters Patent I have shown a main header-frame hinged to the side of the thrashing-machine and having a single wheel supporting its outer end, this wheel being journaled in a frame which has a vertical pivot-pin at its forward end, about which the frame and wheel may turn to accommodate itself to the movements of the machine. A supplemental frame has its rear end hinged to the main-wheel frame, so that its front end may be raised or lowered by suitable mechanism.

In my present invention, A is the frame or casing of the thrashing-machine, which is supported upon bearing-wheels B B, as shown.

C is the header-frame, having the sickle and finger bar D arranged at the front end, and E is the draper or carrying belt by which the cut straw is delivered into the thrashing-machine.
The outer end of the frame C is supported upon a wheel, F, which is journaled in a swinging frame, G, the front end of which is pivoted to the main frame at H, as described in my former application, and I is a curved track or guide over which the rear end of the frame G moves when the wheel of the frame turns about its pivot-point.

The frame C of the header is connected to the side of the separator in the following manner: A hole or socket is made horizontally through the frame-timber C, which lies parallel with and nearest to the separator, and a stout bolt or shaft, J, passes through this opening and is secured in place by a nut or other suitable fastening. This journal is in line with the journals of the wheel F at the outer end of the frame, so that the whole of the frame C may be turned about these two points to raise and lower the front edge, and the sickel to cut higher or lower. The inner end of the shaft J has a transverse journal-bar, K, which turns in suitable lugs or bearings, L, which are firmly secured to the timbers of the separator-frame, as shown in Fig. 3. This journal K stands horizontally at right angles with the journal J, and thus allows the outer end of the frame C to rise and fall as the wheel F may pass over irregular ground, the two journals thus allowing the frame a motion similar to that which is accomplished by a universal joint.

In order to raise and lower the front of the frame C about its pivot or journal pin J, and adjust the sickel to the proper height for this work, I employ the following mechanism:

M is a stout beam fixed to the side of the separator-frame, and extending upward and outward at an inclination, so that its end stands over the header-frame, as shown in Fig. 1. To the upper end of this beam a long lever-arm, N, is pivoted, and its handle O extends backward above the rear portion of the separator, so that the operator standing upon this portion of the separator may have the handle within convenient reach.

P is a rack attached to the side of the separator, and the notches in it serve to hold the lever N at any point where it may be desired. Q is a rod, the upper end of which is connected with the lever N, and the lower end is attached to the rear inner end of a timber, C', which is secured to the rear end of the header-frame C, or may form a part of it. It will be seen that when the lever N is raised it will raise the rear side of the header-frame and depress the sickel, and when the lever N is depressed the opposite movement will be effected, the header-frame moving easily about its journal-pin J and the axle of the wheel F at the outer end.

R is a box at the rear end of the header-frame, into which a sufficient weight may be put to counterbalance the header-frame to make it move easily about its journals.

In order to guide and steady the rear end of the header in its movements when being raised and lowered, and also prevent its rear end from being forced against the side of the separator on account of the side draft and the single pivot-pin J, I employ a stout curved guide, S, which is fitted to and supported from the rear end of the separator-frame, as shown in Fig. 1.

T is a frame-work fixed to the rear inner end on the header-frame, and having a roller, U, journaled in it outside of the guide S, so that as the rear of the header-frame is raised or lowered, by means of the lever and mechanism previously described, this roller may travel against the edge of the guide S, and thus steady the header-frame and keep the parts in their proper position and also reduce the friction which would otherwise exist. It will be manifest that a slide may be used in the same manner, but I prefer a roller, as giving less friction.

V is a beveled gear-wheel upon the outer end of the shaft of the wheel B which is nearest to the header-frame, and this wheel engages and drives a beveled pinion, W, which is mounted to slide upon a feather on the horizontal shaft X. One end of this shaft is journaled in a box at Y, this box being fitted to turn loosely on the end of the axle of wheel B, thus holding this end of the shaft so that it stands radially and parallel with the face of the wheel V, and so that the beveled pinion W will engage with the gear-wheel.

The end of the shaft X (which extends along the side of the separator-frame) has a gear-wheel, Z, upon it, and this engages with another gear-wheel, Z', upon a shaft, $a$, extending across the inner front end of the header-frame, and having a crank or eccentric, $b$, upon its outer end by which the sickle D is driven.

In order to throw the pinion W into or out of gear with the wheel V, a collar is fixed to the pinion so as to form a channel or groove, $c$, or a groove may be turned in the hub of the pinion.

$d$ is a sliding frame having a lug or projection which enters the groove $c$, and this frame has a circular opening formed in it into which an eccentric fits. The pivot-pin $f$ of this eccentric is secured to the side of the frame, and a handle, $g$, is fixed to the eccentric, so that by moving the handle to one side or the other the eccentric is caused to turn and thus move the sliding frame $d$ forward or back. This either forces the pinion forward so as to engage with the gear-wheel V, or draws it back so that it is thrown out of gear, and this stops the sickle and also the carrier-belt E, which is driven from the same shaft, so that whenever it is desired to stop the sickle it may be done by the movement of the lever $g$.

The reel H is driven by a belt from a pulley upon the shaft $i$, and this is driven by a chain, $j$, passing around a sprocket-wheel upon this shaft, and another one upon the end of the wheel-shaft B. In order to keep this chain tight and prevent its being influenced by the raising and lowering of the header-frame, the two parts of it pass beneath the pulleys $k$, (shown in Fig. 3,) these pulleys being situated in line with and just above the journal-pin J, about which the header-frame moves.

From the manner in which the frame C of the header is connected with the side of the separator, a considerable side strain is brought upon the outer end of this frame, the tendency of which will be to twist it. In order to resist this twisting strain I employ a diagonal brace, $C^2$, which extends from the outer front bar of the frame C to the rear and inner end, where it is mortised or fixed to the frame-timbers C, which lie next to the separator, and at a point just beneath the guide-roller of the frame T, so that the torsional strain is all transferred to this point, this single brace making the whole frame perfectly rigid.

The mechanism of the separator is driven by gearing from the bearing-wheel B, upon the opposite side from the header-frame, a gear-wheel, $m$, being secured to the shaft of this wheel and meshing with the pinion $n$. Upon the shaft of this pinion is a gear-wheel, $o$, and this engages with a pinion, $p$, upon a shaft, $q$, having belt-wheels from which the pickers and straw-carrier of the separator may be driven. The grain-carrier is then driven by a chain from the sprocket-wheel $i$ upon the shaft of the pinion $n$. This gearing in my present invention is carried backward from the line of the shaft of the bearing-wheel B, instead of extending forward from it, as in my former patent.

Having thus described my invention, what I claim as new, and desire to secure by Letters Patent, is—

1. In a traveling header and thrasher, the header-frame having its outer end supported upon a single bearing-wheel, its inner end turning upon a journal or pivot pin upon which it is itself journaled on the thrasher to allow vertical movement of the frame, in combination with a lever-arm, N, pivoted at its front end to a standard, M, projecting from the thrasher, and connected with the rear of the header-frame through the rod Q, and a holding-rack attached to the separator, substantially as described.

2. In a traveling header and thrasher, the header-frame, a single bearing-wheel upon its outer end, its inner end turning upon a pivot, J, located in line with the bearing-wheel, the said pivot-pin being journaled on the thrasher-frame, whereby the outer end of the header may be raised or lowered, and an operating lever-arm combined with guiding mechanism for the rear of the header, consisting of a curved guide, S, fixed to the thrasher, and a roller, U, substantially as described.

3. In a traveling header and thrasher, the header-frame having a supporting-wheel for its outer end, a pivot-pin, J, for its inner end, connected pivotally to the thrasher, whereby its outer end may be raised or lowered, a guiding mechanism for the rear side of the header, consisting of the curved guide S, a slide, U, in combination with the pinion W, sliding on the feather of the driving-shaft X, by which the sickle is driven, said shaft being journaled at one end on the axle and at the other in the header-frame, and the eccentric $e$, with its operating-handle $g$, whereby the pinion is thrown into or out of gear with the beveled gear V upon the side of the thrasher, substantially as described.

In witness whereof I have hereunto set my hand.

DANIEL HOUSER.

Witnesses:
S. H. NOURSE,
H. C. LEE.